United States Patent
Mörsberger et al.

(10) Patent No.: US 6,556,618 B1
(45) Date of Patent: Apr. 29, 2003

(54) TRANSMITTER, RECEIVER AND METHOD IN A TELECOMMUNICATION SYSTEM FOR GENERATING PN SEQUENCES FOR A PLURALITY OF USER CHANNELS

(75) Inventors: Gerd Mörsberger, Bubenreuth (DE); Gian Huaman-Bollo, Nürnberg (DE); Helmut Leuschner, Nürnberg (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/382,795

(22) Filed: Aug. 25, 1999

(30) Foreign Application Priority Data

Aug. 26, 1998 (DE) .......................... 198 38 782

(51) Int. Cl.⁷ .............................. H04B 1/69; H04J 3/00; G06F 7/58
(52) U.S. Cl. ..................... 375/146; 375/147; 327/164; 370/280; 370/345; 708/250; 341/173
(58) Field of Search ................. 375/147, 146, 375/149, 200, 267, 259, 206, 208, 209, 356, 358, 371; 708/250, 251, 252; 370/280, 203, 206, 320, 345; 327/164; 341/173

(56) References Cited

U.S. PATENT DOCUMENTS

| | | | |
|---|---|---|---|
| 4,142,240 A | | 2/1979 | Ward et al. |
| 5,600,845 A | | 2/1997 | Gilson |
| 5,608,722 A | * | 3/1997 | Miller .................. 370/203 |
| 5,610,938 A | | 3/1997 | Kokaji |
| 5,640,401 A | | 6/1997 | Yamada |
| 6,072,823 A | * | 6/2000 | Takakusaki ............ 327/164 |
| 6,094,421 A | * | 7/2000 | Scott .................... 370/252 |

FOREIGN PATENT DOCUMENTS

| | | |
|---|---|---|
| EP | 0523571 A1 | 7/1992 |
| JP | 09252490 A | 9/1997 |
| JP | 10190527 A | 7/1998 |

* cited by examiner

Primary Examiner—Stephen Chin
Assistant Examiner—Edith Yeh

(57) ABSTRACT

In a telecommunication system where a plurality of user channels are processed in a time-slotted manner, a transmitter and receiver can perform bit error rate measurements for a plurality of user channels by only using one PN-generator (T-PN) and one state memory (ISM). Whenever the beginning of a new time-slot is detected, a last-stored phase state is read out from the state memory (ISM). When detecting the end of the respective time-slot, the phase state then present in the PN-generator (T-PN) is stored into the state memory (ISM) to be used for re-initialization of the PN-generator (T-PN) for the same time-slot in a succeeding frame. Thus, one PN-generator (T-PN) is enough for generating PN-sequences for a great number of user channels.

41 Claims, 7 Drawing Sheets e.g. 100 bits of user channel 1

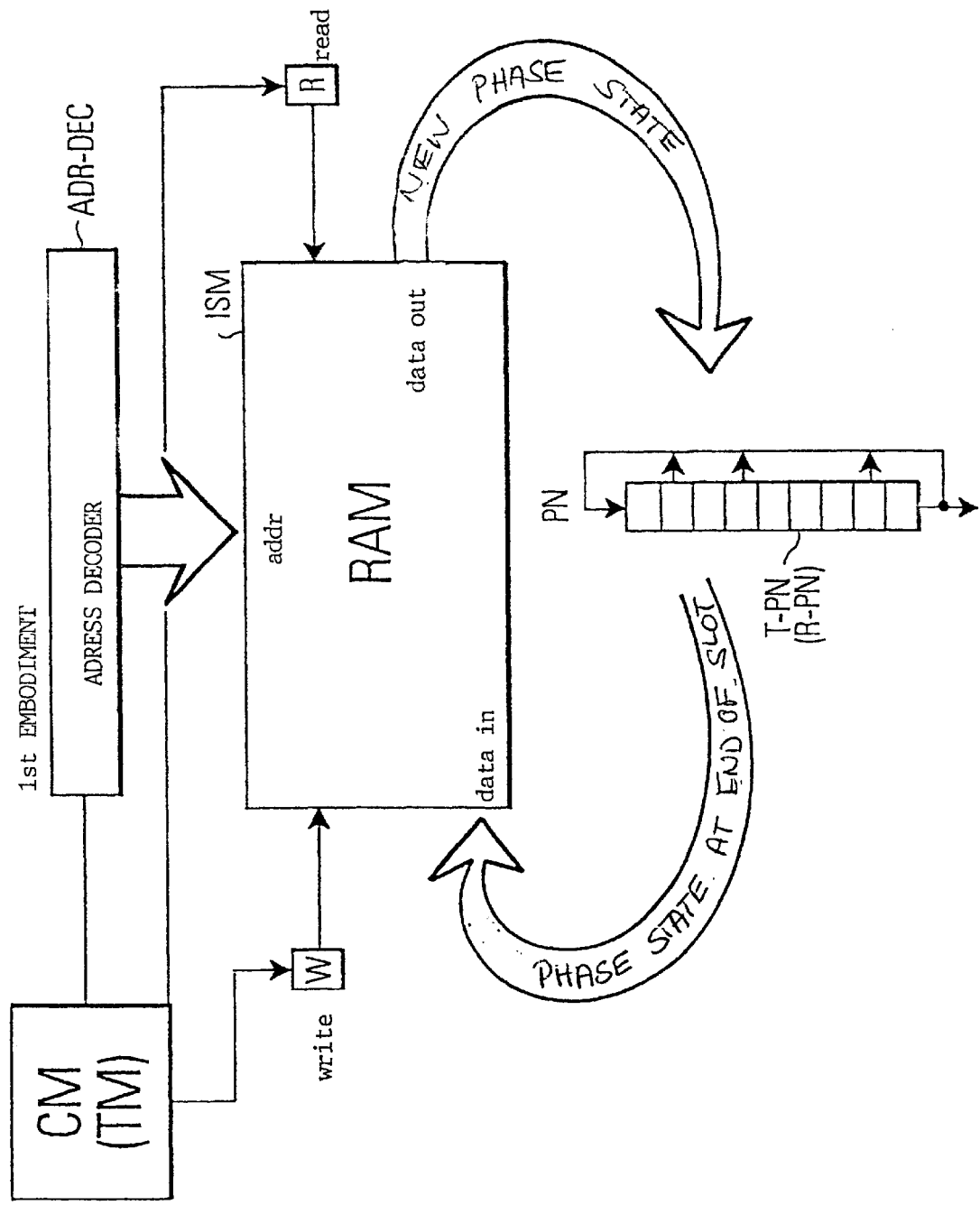

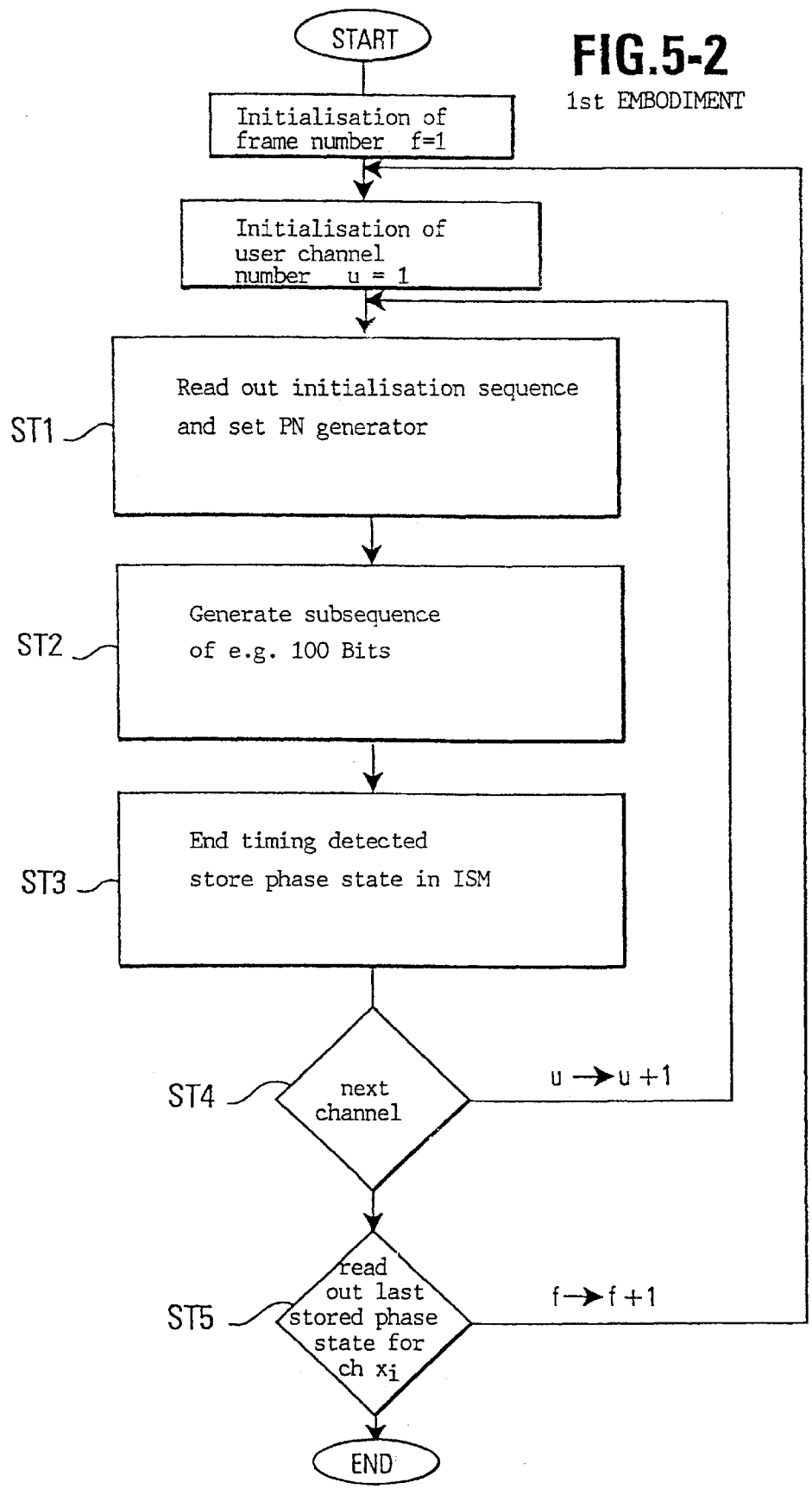

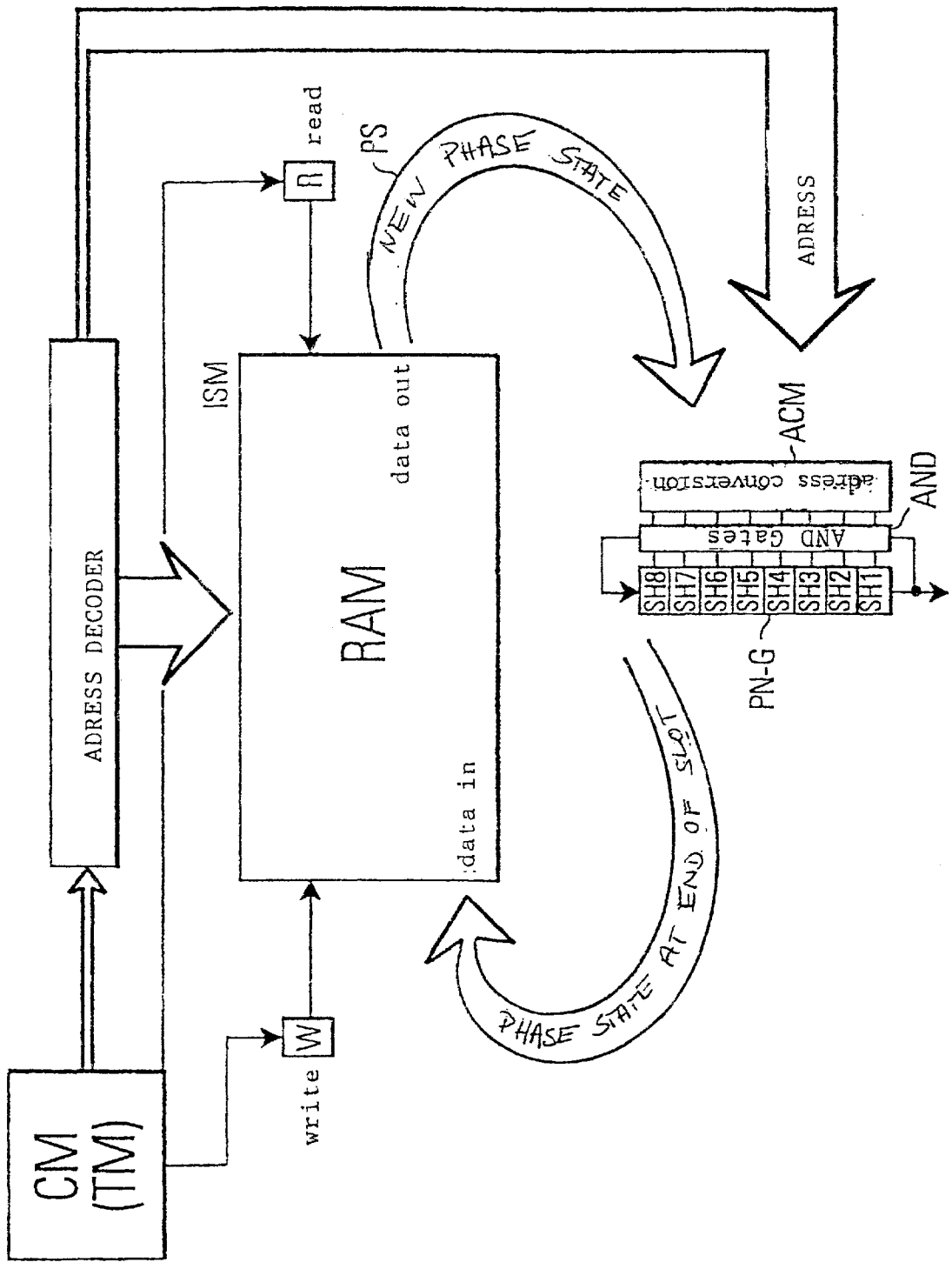
FIG.6 2nd EMBODIMENT

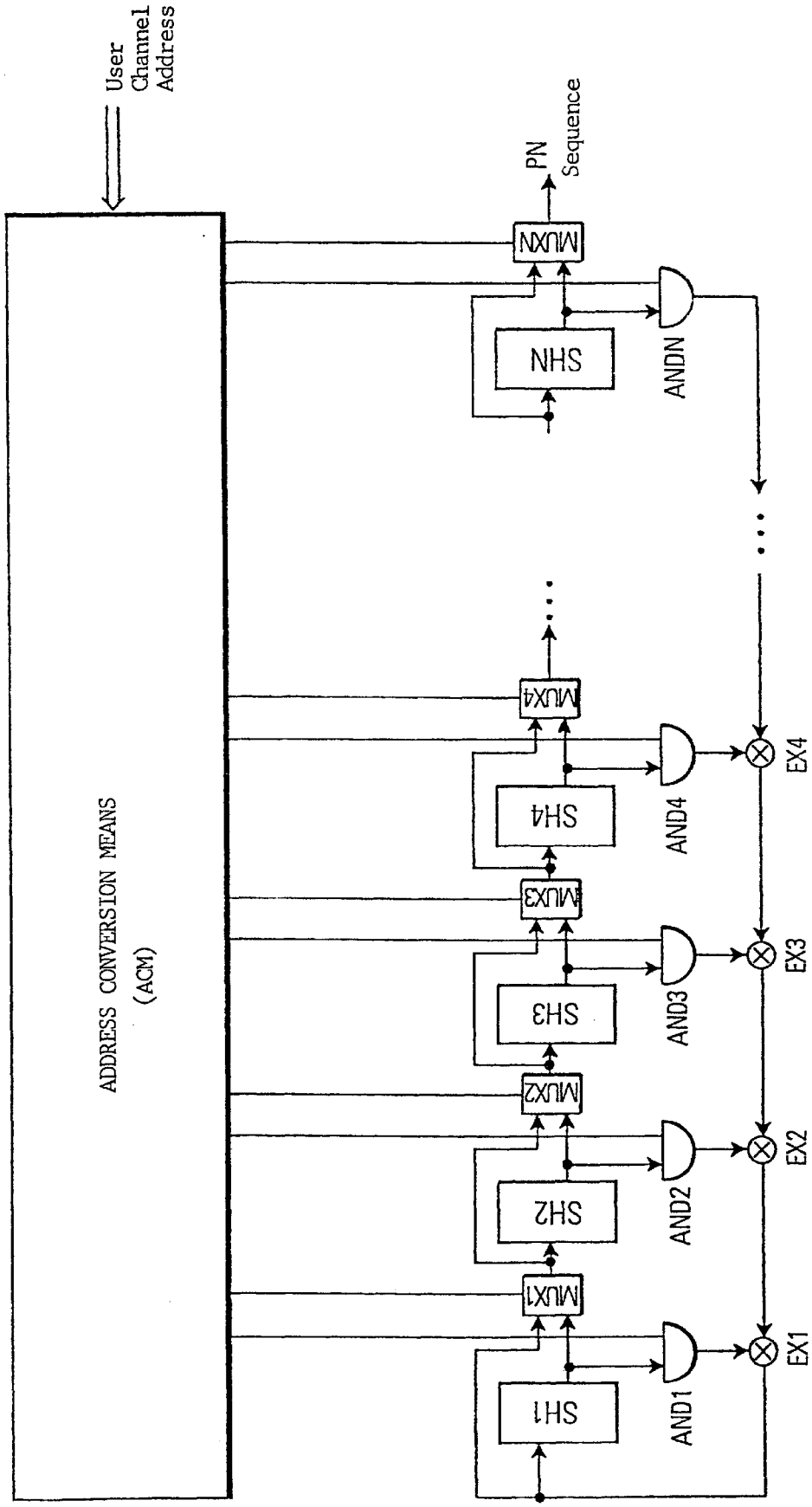
FIG. 7   2nd EMBODIMENT

TRANSMITTER, RECEIVER AND METHOD IN A TELECOMMUNICATION SYSTEM FOR GENERATING PN SEQUENCES FOR A PLURALITY OF USER CHANNELS

FIELD OF THE INVENTION

The invention relates to a transmitter, a receiver and a method in a telecommunication system for providing PN sequences for different user channels. In particular, the present invention relates to such a transmitter, receiver and method in a telecommunication system, in which a plurality of user channels are processed using a time-slot multiplexing of user data in respective transmission frames.

Such PN sequences are generally used for performing bit error rate measurements in telecommunication systems. For this purpose, a known PN sequence of a predetermined length, i.e. a predetermined number of bits $2^N-1$ (where N denotes the number of shift registers of the PN generator) is encoded in the transmitter and the received sequence is decoded in the receiver.

FIG. 1 shows a general overview of a typical decoder circuit in a CDMA-system, where the block "BER measurement ③ "evaluates the bit error rate BER by decoding a received PN-sequence (PN: Pseudo noise). FIG. 2 shows the principle of performing such bit error rate measurement. A telecommunication system TELE comprises a transmitter TX and a receiver RX. In the transmitter TX a transmitter PN-generator T-PN (consisting of interconnected shift registers) is initialized with a predetermined sequence "111111111" and likewise at the receiver RX a PN-generator R-PN must be initialized with the same initializing sequence. It is essential, that the PN-generator T-PN in the transmitter TX and the PN-generator in the receiver RX are synchronized. As indicated in FIG. 2, one possibility is to use a control channel for setting the start timing of the PN-generators in the transmitter TX and in the receiver RX. Once the PN-generators have been initialized and started in the synchronized manner, the bit error rate measurement circuit in the receiver RX can compare the PN-sequence generated in the receiver with the received and decoded sequence from the transmitter TX in order to evaluate the discrepancies of the generated bits.

With respect to the PN-generators T-PN, R-PN, it may be noted that these PN-generators are generally constituted by a series connection of shift registers SH1–SHN with intermediate EXOR gates EX1–EXN−1 (where EX1 denotes the first XOR gate and EXN−1 denotes the (N−1)th XOR gate, i.e. the last provided XOR gate) from which the input of the first shift register SH1 of the PN-generator is built. This is a generally known configuration and an illustration of the general interconnection of the EXOR gates and the shift registers can be seen in FIG. 4. That is, the actual length $2^N-1$ of the PN-sequence is determined by the number N of shift registers and the actual polynomial used for generating the PN sequence, i.e. the type of the PN-sequence is determined by the number of inputs to the EXOR gates for the first shift register, as is well-known.

Thus, both transmitter and receiver PN-generators T-PN, R-PN of the telecommunication system TELE in FIG. 2 comprise such an interconnection of gates and shift registers and whenever user data of the user channel is to be coded by using the PN-sequence in a transmitter and using the PN-sequence in the receiver, the shift registers must be set with a predetermined sequence in a synchronized manner (where the bit sequence must not be a state of "all 0").

BACKGROUND OF THE INVENTION

Whilst the general technique of performing bit error rate measurements using known PN-sequences and the constitution of the PN-generators as explained above is well-known in the prior art in order to evaluate one channel for one user, there are specific problems when time-slotted transmissions, i.e. time-slot multiplexing of user data on a plurality of user channels in respective transmission frames are used for the transmission between the transmitter TX and the receiver RX and/or for the processing of a plurality of user channels.

That is, FIG. 2 only shows the situation for performing bit error rate measurements for one user channel and if there are a plurality of users (user channels) which use one frame in a time-slotted manner, then invariably several PN-generators must be used, each dedicated to one user channel. That is, assuming that in a telecommunication system, where communications and/or processings are carried out using such a time-slot multiplexing technique, for example up to 512 user channels (depending on the channel size) can be handled and thus 512 individual channel bit error rate measurements must be performed by respectively using their specifically dedicated PN-sequences.

In this connection, it should be noted that the expression "time-slot multiplexing of user data on a plurality of user channels in respective transmission frames" can relate to various different modulation schemes used in common telecommunication systems, i.e. TDMA multiplexing schemes or CDMA multiplexing schemes. The essential feature that is common to all such modulation schemes is that each user channel will be assigned a particular time-slot in a transmission frame. For example, FIG. 1 shows the general overview over a CDMA system, where a number of user channels are input to a slot demultiplexer and a decoding is carried out in the time-slot segmentation, the bit interleaving and the Viterbi decoder, before the user data undergoes the bit error rate measurement in the block ③. Here, in this CDMA system, for example up to 512 user channels are received in individual bursts in associated time-slots of a transmission frame.

In FIG. 3 two transmission frames FR of a time-slot mulitplexing system are shown. In each frame FR a great plurality of user channels (e.g. 512 user channels) must be accommodated. The complete user data of one user channel is distributed over a number of consecutive frames FR respectively at the same position (here at the beginning of the frame). However, the user data may also be distributed at different positions within the frame FR.

In FIG. 3 the user channel of user 1 is allocated to the first time-slot position in the frame FR. Typically with a frame length of 10 ms, a slot of 1/512 of the frame and a bit period of 8 MHz, only about 100 bits of the complete PN-sequence generated by the transmitter or receiver PN-generator can be accommodated in the first time-slot (user channel) in the first frame FR, as illustrated in FIG. 3. Of course, assuming for example N=9 shift registers in the PN-generator, the actual length of the Pseudo Noise sequence is $2^N-1=511$ bits. Therefore, of course only 100 bits are not sufficient in order to fully evaluate the channel for the user 1. Therefore, assuming that the PN-generators in the transmitter and in the receiver were synchronized at the beginning of the first frame, then the bit error rate measurement can not be continuously performed for the user 1, since only after a certain number of bits, i.e. 100 bits, the transmission is interrupted—for that user—within each frame. That is, after the first 100 bits of the first user channel 1, the next 100 bits of user channel 2 are transmitted, that is, the other positions in the first frame FR are respectively allocated to the other users. Therefore, between the start timing and the end timing of each time-slot only a limited number of bits from the PN-sequence used for the user channel 1 can be evaluated.

The consequence of this is that the PN-generators must stop their operation—for the first user—at the end timing of each time-slot at the receiver and the transmitter and must continue their PN-sequence generation from the last state (i.e. from a last phase state of the PN-generators) at the start timing of the respective time slot in the next frame (i.e. in FIG. 3 in the second frame FR). In particular, it is not possible to just let the PN-generator continue to output the bits of the bit sequence, when the next user channel starts, since the phase state, which the PN-generator had at the end timing of the first user time-slot, must be available, when the next portion of the user data of user channel 1 is transmitted at the first position in the second frame FR. That is, in the second frame the PN-generation must be continued from the last phase state which the PN-generator had at the end timing of the first time-slot in the first frame FR.

Therefore, as is shown in FIG. 4, each user channel 1, 2 . . . 512 is conventionally provided with separate PN-generators, whose operation is interrupted at the end timing of a number of bits corresponding to the available time-slot in the frame for each user. That is, the shift registers SH1 . . . SH9 schematically shown in FIG. 4 respectively generate the PN-sequence, however, they hold their internal phase state (defined as the bit sequence respectively stored in said shift registers) at the end timing of the respective time-slot, since they are simply stopped. Thus, a control means initiates the further generation of the bit sequence by triggering the respective PN-generator in accordance with the time-slot (user channel) at each slot position beginning in the frame.

The conventional solution shown in FIG. 4 has drastic disadvantage. For example, as was discussed with reference to the encoder circuit in FIG. 1, up to 512 different users may be present and thus up to 512 different PN-generators each to be initialized with 9 bits must be provided. Often such PN-generators are implemented in hardware using a FPGA (Field Programmable Gate Array) library, which can for example realize 4 flip-flops in 1 PFU (Programmable Functional Unit). In this case, the total amount $m_{pFu}$ of PFUs would be:

$m_{pFu}$=512 (number of users) * 9 bit (number of shift registers N)=512 * 3 PFUs=1536 PFUs.

Besides the fact that no driving or control logic is included in the above calculation of $m_{pFu}$ for the required hardware, the individual PN-generators must be triggered at the correct time-slot position within the frame. Thus, the amount of hardware, i.e. 1536 PFUs, is very large in order to handle the bit error rate measurement for a large number of users such as are typically present in a CDMA system as is schematically shown in FIG. 1.

SUMMARY OF THE INVENTION

Above it has been explained that in particular for telecommunication systems using a time-slot multiplexing in frames for the processing of user channels, for example in the TDMA or CDMA transmission methods (CDMA uses a burst transmission) a number of user channels are employed and the problem exists that each user channel must perform its own BER measurement by employing a separate PN-generator in the transmitter and in the receiver which causes the high hardware amount.

Therefore, the object of the present invention is the provision of a transmitter, a receiver, a telecommunication system and a method, which allow the BER measurement for a plurality of user channels with minimum hardware resources

SOLUTION OF THE OBJECT

The object of the present invention is solved by a transmitter (claim 1) of a telecommunication system in which a plurality of user channels are processed using a time-slot multiplexing of user data in respective transmission frames, comprising one single transmitter PN generator including a number N of shift registers for generating PN sequences of a predetermined number of bits, wherein said predetermined number of bits $2^N-1$ is larger than the number of bits which can be transmitted for each user channel in a respective time slot, a PN generator phase state memory for storing phase states of said PN generator for each user channel, a phase state being defined as a bit sequence respectively stored in said shift registers of said PN generator, a timing means for detecting a start timing and an end timing of each time slot of each user channel and a read/write means for writing phase states read out from said memory into said PN generator and for writing phase states read out from said PN generator to said memory, said read/write means being adapted for reading out a phase state for a particular user channel from said memory and writing said read out phase state into said PN generator, when said timing means detects a start timing of a time slot in said frames assigned to said particular user channel, and for reading out the phase state of said PN generator and writing said read out phase state into said memory, when said timing means detects the end of the time slot belonging to said particular user channel.

Furthermore, this object is solved by a receiver (claim 9) of a telecommunication system in which a plurality of user channels are processed using a time-slot multiplexing of user data in respective transmission frames, comprising one single receiver PN generator including a number N of shift registers for generating PN sequences of a predetermined number of bits $2^N-1$, wherein said predetermined number of bits $2^N-1$ is larger than the number of bits which can be transmitted for each user channel in a respective time slot, a PN generator phase state memory for storing phase states of said PN generator for each user channel, a phase state being defined as a N bit sequence respectively stored in said shift registers of said PN generator, a timing means for detecting a start timing and an end timing of each time slot of each user channel, and a read/write means for writing phase states read out from said memory into said PN generator and for writing phase states read out from said PN generator to said memory, and said read/write means being adapted for reading out a phase state for a particular user channel from said memory and writing said read out phase state into said PN generator, when said timing means detects a start timing of a time slot in said frames assigned to said particular user channel, and for reading out the phase state of said PN generator and writing said read out phase state into said memory, when said timing means detects the end of the time slot belonging to said particular user channel.

Furthermore, this object is solved by a telecommunication system (claim 17) in which a plurality of user channels are processed using a time-slot multiplexing of user data in respective transmission frames, comprising at least one transmitter including a single transmitter PN generator including a number N of shift registers for generating PN sequences of a predetermined number of bits $2^N-1$, wherein said predetermined number of bits $2^N-1$ is larger than the number of bits which can be transmitted for each user channel in a respective time slot, a transmitter PN generator phase state memory for storing phase states of said transmitter PN generator for each user channel, a phase state being defined as a bit sequence respectively stored in said shift registers of said transmitter PN generator, a transmitter timing means for detecting a start timing and an end timing of each time slot of each user channel, a transmitter read/write means for writing phase states read out from said transmitter memory into said transmitter PN generator and for writing phase states read out from said transmitter PN generator to said transmitter memory, and said transmitter read/write means reading out a phase state of a particular user channel from said transmitter memory and writing said read out phase state into said transmitter PN generator, when said transmitter timing means detects a start timing a time slot in said frames assigned to said particular user channel, and reading out the phase state of said transmitter PN generator and writing said read out phase state into said transmitter memory, when said transmitter timing means detects the end timing of the time slot belonging to said particular user channel; and at least one receiver comprising one single receiver PN generator including a number N of shift registers for generating PN sequences of a predetermined number of bits $2^N-1$, wherein said predetermined number of bits $2^N-1$ is larger than the number of bits which can be transmitted for each user channel in a respective time slot, a receiver PN generator phase state memory for storing phase states of said receiver PN generator for each user channel, a phase state being defined as a N bit sequence respectively stored in said shift registers of said receiver PN generator, a receiver timing means for detecting a start timing and an end timing of each time slot of each user channel, a receiver read/write means for writing phase states read out from said receiver memory into said receiver PN generator and for writing phase states read out from said receiver PN generator to said receiver memory; and said receiver read/write means reading out a phase state of a particular user channel from said receiver memory and writing said read out phase state into said receiver PN generator, when said receiver timing means detects a start timing a time slot in said frames assigned to said particular user channel, and reading out the phase state of said receiver PN generator and writing said read out phase state into said receiver memory, when said receiver timing means detects the end of the time slot belonging to said particular user channel.

The object is also solved by a method (claim 26) for generating PN sequences of a predetermined number $2^N-1$ of bits for a plurality of user channels in a telecommunication system, in which said plurality of user channels are processed using a time-slot multiplexing of user data in respective transmission frames, by means of a single PN generator including a number N shift registers, wherein said predetermined number of bits of said PN sequence is larger than the number of bits which can be transmitted for each user channel in a respective time slot, comprising the steps of loading a PN generator with a user channel specific phase state stored in a PN generator phase state memory when a start timing of the time slot assigned to the specific user channel in the frame is detected, said phase state being defined as a N bit sequence, building the PN sequence for the specific user channel during the specific time slot, and writing the phase state obtained in said PN generator at the end of said specific time-slot into said PN generator phase state memory as a new user channel specific phase state, wherein said sequence of said loading, building and writing steps is repeated for each specific user channel in its specific time slot.

The object is also solved by a transmitter further comprising first inverters for inverting bits at predetermined bit positions of said phase state read out from the phase state memory before it is written into the PN generator and second inverters for inverting bits at said predetermined bit positions of the phase state PST read out from the PN generator before it is written into said phase state memory; a transmitter of a telecommunication system in which a plurality of user channels are processed using a time-slot multiplexing of user data in respective transmission frames, comprising: said PN sequence programming means comprises an address conversion means for converting a user channel address into programming signals and a gate means for receiving said programming signals and for feeding the output signals of said PN registers back via gates generating the input for the first shift register of said PN generator in response to said programming signal; said gate means includes a number of AND gates receiving said programming signal at one input and receiving said output signals of the shift registers at another input thereof and outputting a signal to a respective EXOR gate, said programming signal determining the type of PN sequence generated by said PN generator; said gate means further includes multiplexer gates having an output terminal connected to an input of the next shift registers, having one input terminal thereof connected to the output of the associated shift register and having another input terminal connected to the input of said associated shift register, and having a control input terminal connected for receiving a programming signal from said address conversion means, said programming signal applied to said multiplexer gates determining the length of PN sequence generated by said PN generator for each user channel.

The object is also solved by a receiver further comprising first inverters for inverting bits at predetermined bit positions of said phase state read out from the phase state memory before it is written into the PN generator and second inverters for inverting bits at said predetermined bit positions of the phase state read out from the PN generator before it is written into said phase state memory; a receiver of a telecommunication system in which a plurality of user channels are processed using a time-slot multiplexing of user data in respective transmission frames, comprising: one single receiver PN generator including a number of shift registers for generating PN sequences of a predetermined number of bits $2^N-1$, wherein said predetermined number of bits $2^N-1$ is larger than the number of bits which can be transmitted for each user channel in a respective time slot; a PN generator phase state memory for storing phase states of said PN generator for each user channel, a phase state being defined as a bit sequence respectively stored in said shift registers of said PN generator; a timing means for detecting a start timing and an end timing of each time slot of each user channel; a read/write means for writing phase states read out from said memory into said PN generator and for writing phase states read out from said PN generator to said memory; and said read/write means reading out a phase state for a particular user channel from said memory and writing said read out phase state into said PN generator, when said timing means detects a start timing of a time slot in said frames assigned to said particular user channel; and reading out the phase state of said PN generator and writing said read out phase state into said memory, when said timing means detects the end of the time slot belonging to said particular user channel; said PN generator comprises a sequence programming means for programming said PN generator to produce a predetermined PN sequence; said PN sequence programming means comprises an address conversion means for converting a user channel address into programming signals and a EXOR gate means for receiving said programming signals and for feeding the output signals of said shift registers back via EXOR gates generating the input for the first shift register of said PN generator in response to said programming signal; said gate means includes a number of AND gates receiving said programming signal at one input and receiving said output signals of the shift registers at another input thereof and outputting a signal to a respective EXOR gate, said programming signal determining the type of PN sequence generated by said PN generator; said gate means further includes multiplexer gates having an output terminal connected to an input of next shift register, having one input terminal thereof connected to the output of the associated shift register and having another input terminal connected to the input of said associated shift register and having a control input terminal connected for receiving a programming signal from said address conversion means, said programming signal applied to said multiplexer gates determining the length of the PN sequence generated by said PN generator for each user channel.

The object is also solved by a system wherein bits at predetermined bit positions of said phase state read out from the phase state memory are inverted before they are written into the PN generator and bits at said predetermined bit positions of the phase state read out from the generator are inverted before they are written into said phase state memory; a telecommunication system in which a plurality of user channels are processed using a time-slot multiplexing of user data in respective transmission frames, comprising at least one transmitter, comprising: one single transmitter generator including a number of shift registers for generating sequences of a predetermined number of bits ($2^N-1$), wherein said predetermined number of number of bits ($2^N-1$) is larger than the number of bits which can be transmitted for each user channel in a respective time slot; a transmitter PN generator phase state memory for storing phase states of said transmitter PN generator for each user channel, a phase state being defined as a bit sequence respectively stored in said shift registers of said transmitter generator; a transmitter timing means for detecting a start timing and an end timing of each time slot of each user channel; a transmitter read/write means for writing phase states read out from said transmitter memory into said transmitter generator and for writing phase states read out from said transmitter generator to said transmitter memory; and said transmitter read/write means; reading out a phase state of a particular user channel from said transmitter memory and writing said read out phase state into said transmitter generator, when said transmitter timing means detects a start timing a time slot in said frames assinged to said particular user channel; and reading out the phase state of said transmitter PN generator and writing said read out phase state into said transmitter memory, when said transmitter timing means detects the end of the time slot belonging to said particular user channel; and at least one receiver, comprising: one single receiver PN generator including a number of shift registers for generating PN sequences of a predetermined number of bits ($2^N-1$), wherein said predetermined number of bits ($2^N-1$) is larger than the number of bits which can be transmitted for each user channel in a respective time slot; a receiver PN generator phase state memory for storing phase states of said receiver PN generator for each user channel, a phase state being defined as a N bit sequence respectively stored in said shift registers of said receiver PN generator; a receiver timing means for detecting a start timing and an end timing of each time slot of each user channel; a receiver read/write means for writing phase states read out from said receiver memory into said receiver PN generator and for writing phase states read out from said receiver PN generator to said receiver memory; and said receiver read/write means; reading out a phase state of a particular user channel from said receiver memory and writing said read out phase state into said receiver PN generator, when said receiver timing means detects a start timing a time slot in said frames assinged to said particular user channel; and reading out the phase state of said receiver PN generator and writing said read out phase state into said receiver memory, when said receiver timing means detects the end of the time slot belonging to said particular user channel; said PN generators comprise respectively a PN sequence programming means for programming said PN generator to produce a predetermined PN sequence; said PN sequence programming means comprises an address conversion means for converting a user channel address into programming signals and a gate means for receiving said programming signals and for feeding the output signals of said shift registers back via EXOR gates generating the input for the first shift register of said PN generator in response to said programming signal; said gate means includes a number of AND gates receiving said programming signal at one input and receiving said output signals of the shift registers at another input thereof and outputting a signal to a respective EXOR gate, said programming signal determining the type of PN sequence generated by said PN generator; said gate means further includes multiplexer gates having an output terminal connected to an input of the next shift register, having one input terminal thereof connected to the ouptut of the associated shift register and having another input terminal connected to the input of said associated shift register and having a control terminal connected for receiving a programming signal from said address conversion means, said programming signal applied to said multiplexer gates determining the length of PN sequence generated by said PN generator for each user channel.

PREFERRED ASPECT OF THE INVENTION

According to one aspect of the invention only a single PN-generator in the transmitter and in the receiver is necessary. Instead of using a plurality of PN-generators in the transmitter and in the receiver, the invention uses a state memory, in which the intermediate states (phase states) of each PN-sequence for each channel are stored. If the correct start timing (correct position) in the frame arrives for the respective user channel, the corresponding last phase state of the PN-generator is read from the state memory (RAM) and is used for a re-initialization of the PN-generator at the re-start of the corresponding time-slot of the next frame. As will be explained below the usage of only one PN-generator and one state memory drastically reduces the hardware amount necessary.

According to another aspect of the invention, each user channel can use a different PN-sequence, since the PN-generator can be programmed to yield different PN-sequences in response to a programming signal. That is, if for example there are different kinds of user data in different user channels, the length and the polynomial of the PN-sequence can be different for each user channel. This is advantageously achieved by not only using the read-out address for reading out the last bit sequence from the state memory but by also using it for addressing a PN-sequence programming means of the PN-generator, which in accordance to a programming signal will generate different types and lengths of PN-sequences.

Further advantageous embodiments and improvements of the invention are listed in the dependent claims. Hereinafter, the invention will be explained with reference to its embodiments.

BRIEF DESCRIPTION OF THE DRAWINGS

FIG. 5-1 shows a principle overview of the PN-generator arrangement in a transmitter or receiver according to a first embodiment of the invention;

FIG. 5-2 shows a principle flow chart of the method to generate bit sequences for a plurality of user channels using the configuration in FIG. 5-1;

FIG. 6 shows a PN-generator arrangement with a programmable PN-generator according to a second embodiment of the invention; and FIG. 7 shows an embodiment of the programmable PN-generator used in FIG. 6.

Hereinafter, embodiments of the invention will be described with reference to the drawings. In the drawings the same or similar reference numerals denote the same or similar parts and steps.

First Embodiment

Figure 1:
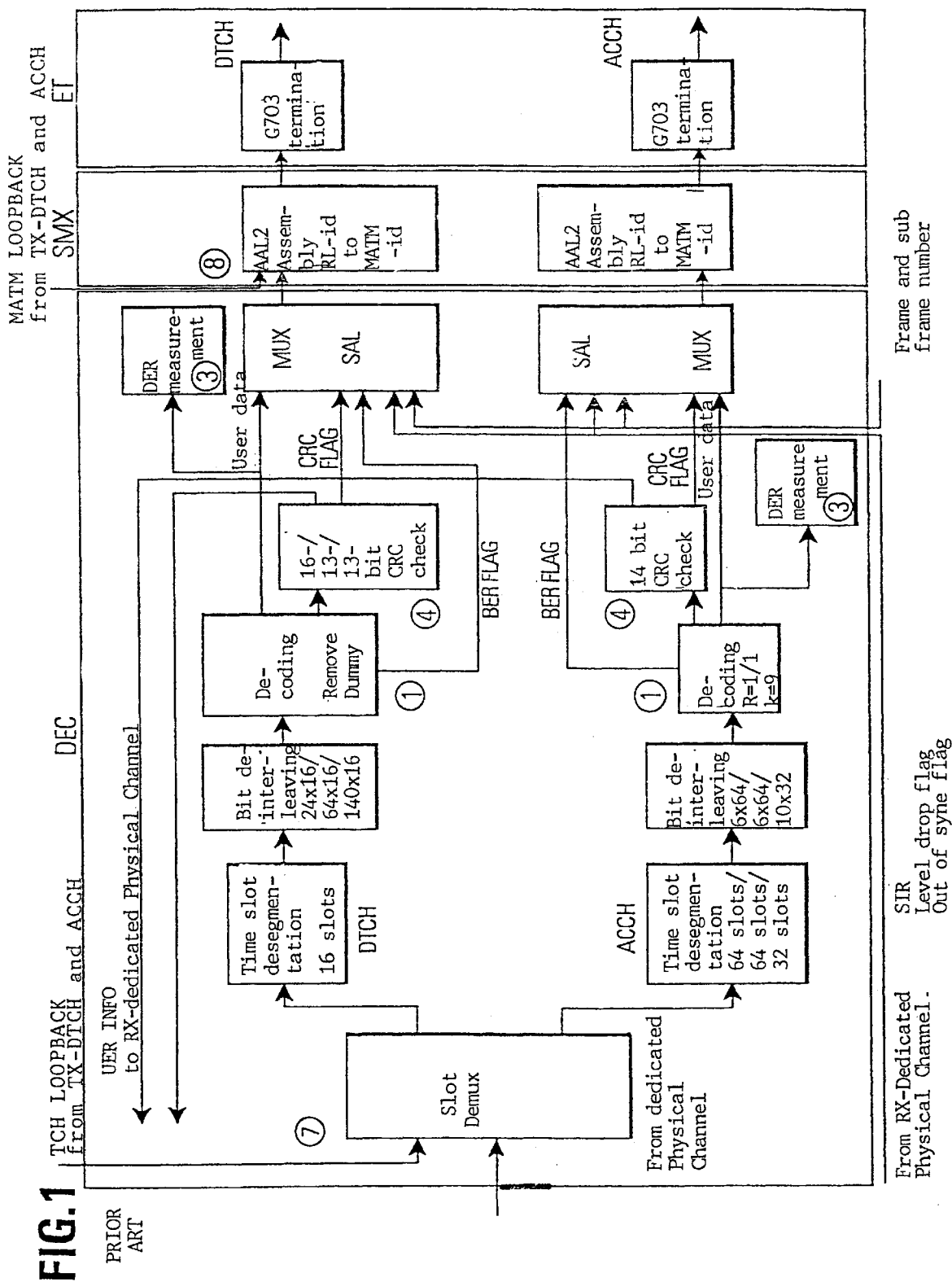
FIG. 1 shows a principle overview of the decoder circuit used in a CDMA receiver.
Figure 2:
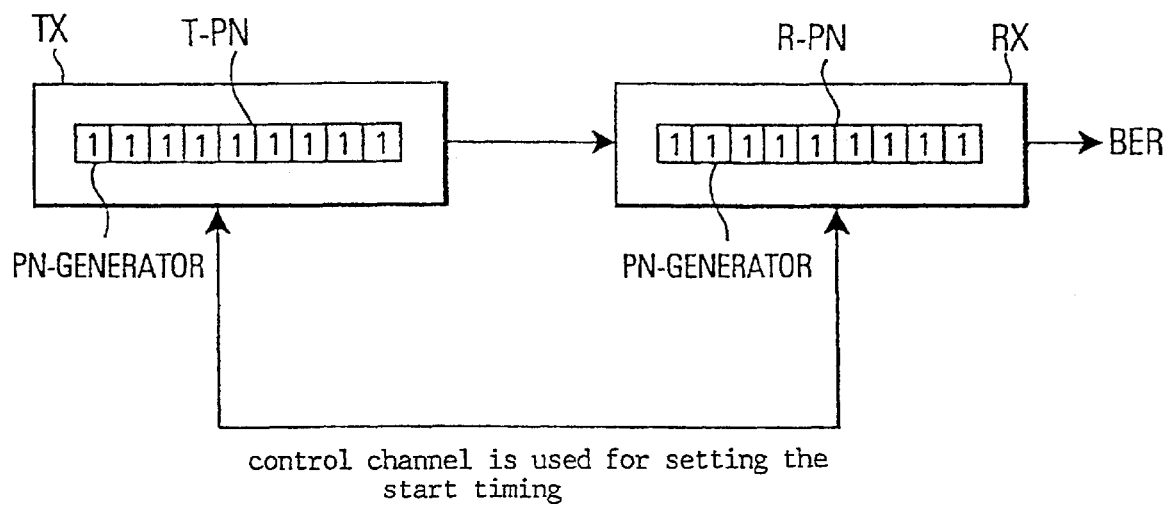
FIG. 2 shows the bit error rate measurement using a PN-generator.

FIG. 5-1 and FIG. 5-2 show the PN-generator configuration used in a transmitter or receiver of a telecommunication system, in which a plurality of user channels US1, US2 are processed using a time-slot multiplexing of user data in respective transmission frames FR, as was generally explained above with reference to FIG. 3. Hereinafter, the functioning of a PN-generation is described with reference to the transmitter, however, the same configuration holds for the receiver as explained above.

As is illustrated in FIG. 5-1, the transmitter TX comprises only a single transmitter PN-generator T-PN. As such, the PN-generator has the same configuration as described above, i.e. it includes a number N of shift registers SH1–SHN for generating PN-sequences of a predetermined number of bits $2^N-1$, wherein it is assumed that said predetermined number of bits $2^N-1$ is larger than the number of bits which can in fact be transmitted for each user channel in a respective time-slot in the frame FR (since otherwise there would obviously be no problem, since the whole PN-sequence can be used for the bit error rate measurement in one time-slot).

A PN-generator phase state memory ISM stores phase states PST of the single PN-generator separately for each user channel. Phase state is here defined as a bit sequence, which is respectively stored in said shift registers of said PN-generator. The memory space of the memory ISM is large enough to hold at any one time simultaneously the intermediate phase states for all user channels. A control means CM incorporating a timing means TM as well as a read/write means R/W is also provided. The basic function of the timing means TM is to detect a start timing and an end timing of each time slot of each user channel and with the detection of start timing of a respective user channel the address decoder ADR-DEC outputs a corresponding user address for reading/writing to the memory ISM. As is illustrated with the arrows in FIG. 5-1, whenever a new user (channel) must be evaluated, a new or last used phase state is read out from the memory ISM and is used for reinitializing the PN-generator T-PN.

As indicated with the arrows in FIG. 5-1 denoting "new phase state" and "phase state at the end of slot", the PN-generation in FIG. 5-1 is generally performed as follows. Once a predetermined number of bits (e.g. 100 bits) have been output by the PN-generator as a PN-subsequence, the last state (phase state) is stored into the memory device RAM at a particular user channel address to be used for re-initializing the PN-generator when a start timing of the same user channel is detected in the next frame. At the start timing of the next user channel the address decoder ADR-DEC outputs a next user channel address and a corresponding phase state for the next user channel is read out from the memory and used for re-initializing the PN-generator. For the next determined number of bits, the PN-generator is then generating a PN-sequence for the next channel time-slot in the frame.

FIG. 5-2 shows a flow chart of the method according to the invention with more detail. Furthermore it is assumed that f and u denote the frame and the user channel number (index), respectively. When the transmission or bit error rate measurement is started in the very first frame (f=1), an initialization sequence is read out from the memory ISM in step ST1. That is, if the timing means determines the start timing of a first user channel (u=1) in the first frame FR (f=1), an initialization sequence is set in the PN-generator in step ST1. Although in principle the initialization sequence could be read out from a simple separate memory, it is preferred to set the initialization sequence as an initialization phase state in all user channel entries in the state memory ISM, such that during the first initialization (f=1) each user channel u will be set with its respective initialization sequence. In this case, the initialization sequences for all user channels can be the same or can in fact be different to each other.

Rather than storing the initialisation sequence of all "1" in the memory ISM at all specific memory locations assigned to the specific-user channels, another possibility for the initialisation is as follows. In a start-up condition or after having been reset the receiver or the transmitter has only "0" stored in all memory locations. Then, without storing the specific "1" sequences in the memory, a first set of inverters may be provided at the ouptut of the memory for inverting the phase state of all "0" before it is written as the initialisation sequence of all "1" into the PN generator. A second set of inverters is provided at the input of the memory ISM for inverting the phase state PST read out from the PN generator before it is written into said phase state memory ISM. Thus, not only during the initialisation process, but also during the writing and reading of intermediate phase states to and from the PN generator the inversion take place; that is all bits are inverted after they have been read from and also before they are written to the memory. In this manner, the correct bit values (all ones, i.e. "1") are obtained directly from the memory whenever it has been reset to the all zero ("0") state. As the bits are inverted twice (at load and store), this leaves the generated PN sequence in the PN generator unaffected.

As explained above, if the initialisation sequence is all "1111 . . . 11" and the reset state of the memory is therefore all "0000 . . . 00" then each input and output line of the memory has an inverter such that the inversion is performed for all bits. However, if the initialisation value is not "1111

... 11" but in fact "1010 ... 10" while maintaining the reset state "0000 ... 00" then the inverters are only provided on such lines (bits) where the initialisation sequence has "1".

Even more generally, if the reset state is also not necessarily all "0000 ... 00" then an inverter is provided (on the input and output of the memory) for such bits of the initialisation sequence and the reset state that are different. For bits where the initialisation sequence and the reset state is the same no inverters at all need to be provided. Therefore another possibility is to invert all bits which differ in their initial value from the reset value of the memory after they have been read from and also before they are written to the memory. In this manner, the correct bit values are obtained directly from the memory whenever is has been reset. As the bits are inverted twice (at load and store) or not at all this leaves the generated bit sequence unaffected while allowing the generation of any initial value directly from the reset state (e.g. all zeros) of the memory. Preferably the reset state used for forming the initialisation sequence is the same for all user channels.

Figure 3:
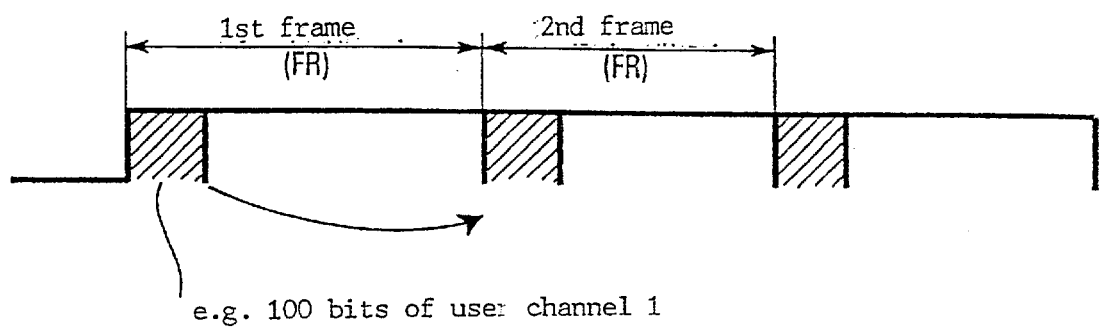
FIG. 3 shows the individual time-slots allocated for an individual user.

In step ST2 the PN-generator, which has been set with the appropriate sequence for the first user channel, generates the subsequence of e.g. 100 bits for this user channel (see also the description of FIG. 3 in this respect). When the timing means determines the end timing for this user channel in step ST3, the phase state present in the PN-generator at this point in time is stored in the memory ISM under the user address output by the address decoder ADR-DEC and belonging to this user channel.

If in step ST4 a further user channel is present in the frame ("Y" in step ST4), then the generation and storage in steps ST1, ST2, ST3 is repeated for the next user channel. The initialization sequence for the second user channel may be different or may be the same as in the first user channel. Again, at the end timing of the second user channel the phase state then present in the PN-generator is stored in the memory ISM under the respective user address.

If there are no more channels detected in step ST4 ("N" in step ST4) then step ST5 determines whether more frames need to be processed or transmitted, i.e. whether the transmission has been stopped.

If in step ST4 it is decided that all user channels of the frame f have finished their sequence ("N" in step ST4) and if there are more frames ("Y" in step ST5) the recursive cycling through steps ST1, ST2, ST3, ST4 is repeated for all user channels in the next frame f+1.

The recursive reading and writing from/to the memory ISM and to/from said PN-generator in steps ST1–ST4 is governed by the timing means TM issuing respective control signals to the read/write means W/R which respectively set a read or write state of the memory ISM for the particular user address issued by the address decoder ADR-DEC. Thus, recursively the phase state of the PN-generator is read out at the end of the time-slot and a new phase state is set into the PN-generator at the beginning of the next slot.

Essentially the above described method of the invention in FIG. 5-2 can be summarized as follows. First a PN generator T-PN or R-PN loaded in step ST1 with a user channel specific phase state PST stored in the respective PN generator phase state memory ISM when a start timing of the time slot assigned to the specific user channel in the frame is detected The phase state is defined as a N bit sequence. Then, the PN sequence for the specific user channel is built in step ST2 during the specific time slot which belongs to the respective user channel in the frame. Then, the phase state PST obtained in said respective PN generator T-PN, R-PN at the end of said specific time-slot is written in step ST3 into said PN generator phase state memory ISM as a new user channel specific phase state PST which is being used and read out again when the same time slot occurs again at a particular timing in the next frame. That is, the sequence of the loading, building and writing steps is repeated from step ST4 through steps ST1, ST2, ST3 for each specific user channel in its specific time slot if there are more time-slots ("Y" in step ST4) and then this is of course repeated sequentially in the time-slots of the next frame if more frames are present ("Y" in step ST5) Due to the reading and writing of the respective user channel specific phase states from and to the memory, only one PN generator can be used for all channels.

It should be noted again here that the above described PN-generation sequence is used for performing continuously the BER measurements in the receiver. The method can be applied to any transmitter, receiver and telecommunication system in which processings, transmissions and communications are carried out for a plurality of user channels in a time-slot manner. The method can be applied to all transmission systems in which a time-slot assignment to different user channels for a data processing or data communication is used, independently from the particular modulation scheme. Two examples are the TDMA and the CDMA time-slot usage in individual frames.

Figure 4:
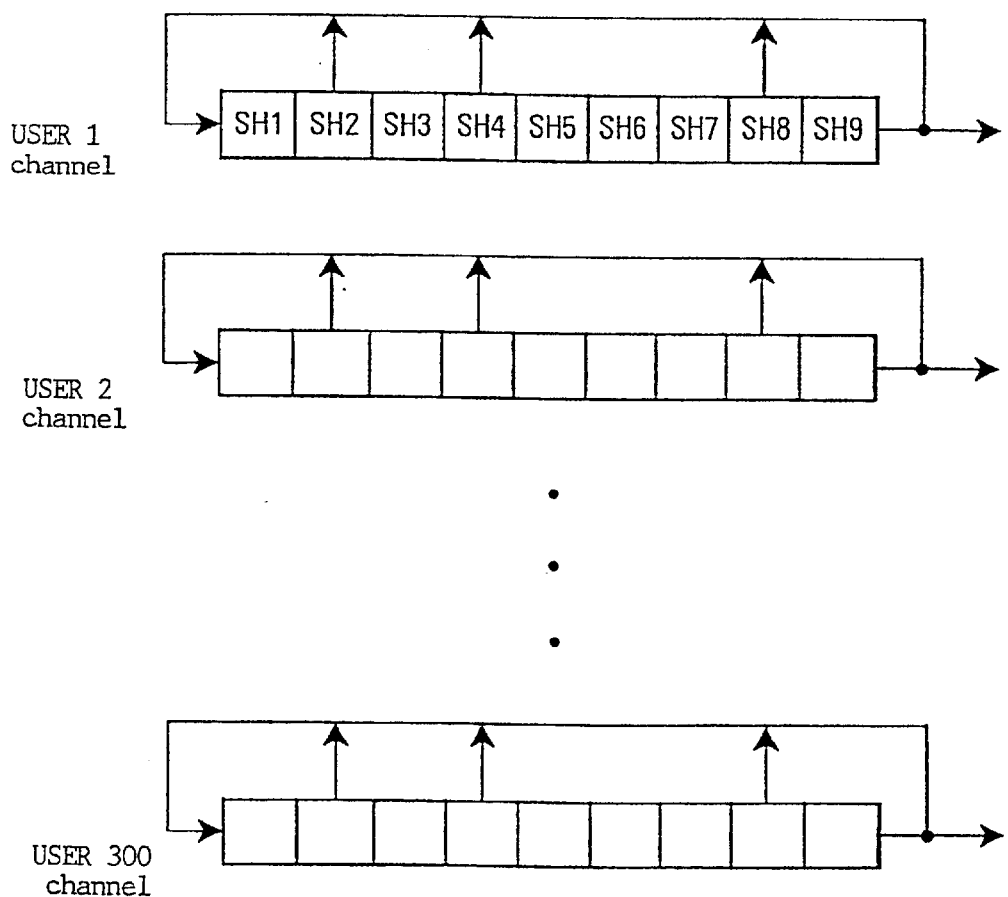
FIG. 4 shows the usage of a number of PN-generators in order to allow a BER measurement for a plurality of user channels according to the prior art.

Above it has already been described that the memory ISM can be a random access memory RAM realized e.g. by a field programmable gate array (FPGA) library. Also the PN-generator can preferrably be realized by such a FPGA. However, the hardware amount necessary for the hardware implementation of the circuit in FIG. 5-1 is drastically reduced by contrast to the configuration in FIG. 4. The reason is, because a RAM memory needs much less resources than registers of a plurality of PN-generators (see FIG. 4), no matter, which technology is used. Assuming that the FPGA library mentioned above would use 1 PFU to implement a RAM which is 16 addresses deep and 4 bit broad, then one would only need 3 PFUs to realize a RAM, which is 16 addresses (=users) deep and 12 bit broad. This means that for 512 users one would only need 32 * 3 PFUs=96 PFUs to store the actual phase state of a 9 bit PN-generator for every single user of the 512 user channels.

In addition, one PN-generator having a width of 9 bit can be realized by 3 PFUs. Furthermore, 9 address registers must be realized corresponding to 3 PFUs. Finally, a read and write flip-flop must be realized which corresponds to 2 PFUs. Thus, it is seen that in total only $$m_{pFu}=(96+3+3+2) \ PFUs=104 \ PFUs$$

need to be used. However, it needs to be emphasized that this size already takes into account the complete driving control logic whilst in the above example of 1536 PFUs in the prior art in FIG. 4 the driving/control logic is not even counted.

Thus, with a minimum hardware effort, a high number of channels can be evaluated regarding their bit error rates when using the principle of generating PN-sequences for BER measurement in the transmitter and receiver.

Second Embodiment

FIG. 6 and FIG. 7 show a second embodiment of the present invention. Basically, the functioning of the circuit in FIG. 6 is the same as the functioning of the circuit in FIG. 5-1 with respect to the reading and writing of the phase states for a plurality of user channels. That is, as is indicated with the arrows "new phase state" and "phase state at the end of slot", at the beginning of each time-slot the respectively last stored phase state is read out from the memory ISM and is written into the PN-generator. At the end timing of the respective time-slot the phase state then obtained in the PN-generator is read out from the PN-generator and is written into the memory ISM under the specific user channel address as designated by the address decoder.

However, the configuration in FIG. 6 differs from the configuration in FIG. 5-1 in the provision of the PN-generator which in FIG. 6 not only consists of a plurality of shift registers SH1–SHN (with intermediate EXOR gates) but also of an address conversion means ACM and a gate means AND and multiplexer MUX the functioning of which will be explained below. The reason for providing the address conversion means ACM and the gate means AND and the multiplexer MUX allows the usage of different types and lengths of PN-sequences for each user channel.

That is, one disadvantage of the configuration in FIG. 5-1 is that the PN-generator configuration is fixed and therefore the same PN-sequence (i.e. the type and length) is used for all users, i.e. user channels. However, it would be desirable to also have a flexible configuration of the PN-sequence generation for each user channel. Therefore, the address conversion means ACM and the gate means AND and the multiplexer MUX constitute a PN sequence programming means PN-PM for programming said PN-generator to produce a predetermined PN-sequence.

FIG. 7 shows an embodiment of the PN-sequence programming means PN-PM which comprises the gate means AND and the multiplexer MUX and the address conversion means ACM. The PN-generator has a conventional configuration with respect to the arrangement of the shift registers SH1–SHN with their intermediate EXOR gates EX1, EX2 . . . EXN-1. Also conventional in FIG. 7 is the principle of generating the feed back from the outputs of the registers to the input of the first register SH1. However, a gate means comprises a plurality of AND gates connected between the EXOR gates and the outputs of the shift registers and the address conversion means. That is, one input of each AND gate AND1, AND2 . . . ANDN is connected to the output of the registers and the other input of the AND gates is connected to the address conversion means ACM.

The address conversion means ACM receives for example the user channel address and determines on the basis of this user channel address the particular type (and length) of the PN-sequence that should be used for the particular user channel. Depending on the desired PN-sequence, the address conversion means then outputs a "1" to the respective AND gate AND1, AND2 . . . ANDN to allow a logical influence of the output to a respective EXOR gate. Thus, in response to each user address, a different type of PN-sequence can be programmed into the PN-generator. The "1" outputs of the address conversion means ACM which are input to the respective AND gates serve as programming signals for programming the specific type of PN polynomial in the PN-generator.

It may be appreciated from FIG. 7 that only the provision of the AND gates does not allow to change the length $2^N-1$ of the PN-sequence, since the number N of shift registers SH1–SHN is still fixed. However, the address conversion means can also output a further programming signal to alter the number of shift registers used. In particular, this programming signal is input to the multiplexer gates MUX1 . . . MUXn connected into the output line of the respective shift registers such that basically the respective shift register is bypassed. Therefore, by additionally outputting programming signals to the multiplexer gates, the number of used shift registers N can be changed and thus the length of the PN-sequence can be altered in addition to the type of the PN-sequence.

Therefore, each user channel can use a different type and/or length of PN-sequence in the time-slot and the respective different types of phase states are written and read from the memory ISM in the same manner as in FIG. 5-1. Furthermore, it should be noted that there are other ways and means how the reading and writing to the memory ISM can be performed. For example, the timing means TM provided in the control means CM may simply count the respective time-slots within the individual frames and apply reading and writing signals to the memory ISM on the basis of the count number which will indicate the particular user channel just as the address provision via the address decoder does. Therefore, the invention is not limited to using the explicit user channel address in FIG. 5-1, FIG. 6 and FIG. 7 the invention is fully functional as long as it is guaranteed that the phase states are written and read from/to the memory ISM and to/from PN-generator cyclically for each user channel (time-slot) separately.

Furthermore, it should be noted that the invention as described above with reference to the drawings and its embodiments only illustrate the presently perceived best mode of the invention. Therefore, a skilled person can on the basis of the above teachings derive other variations and modifications of the invention which fully fall within the scope of the appended claims. Therefore, the invention should not be seen as limited by the description, since other embodiments can easily be devised on the basis of the teachings contained herein. Furthermore, the invention can comprise combinations of individually described features in the description and in the claims.

Reference numerals in the claims only serve clarification purposes and do not limit the scope of protection.

What is claimed is:

1. A transmitter (TX) of a telecommunication system (TELE) in which a plurality of user channels (US1, US2) are processed using a time-slot multiplexing of user data (US1, US2) in respective transmission frames (FR), comprising:

(a) one single transmitter PN generator (T-PN) including a number (N) of shift registers (SH1–SHN) for generating PN sequences of a predetermined number of bits ($2^n-1$), wherein said predetermined number of bits ($2^n-1$) is larger than the number of bits which can be transmitted for each user channel in a respective time slot;

(b) a PN generator phase state memory (ISM) for storing phase states (PST) of said PN generator (T-PN) for each user channel, a phase state being defined as a bit sequence respectively stored in said shift registers of said PN generator;

(c) a timing means (TM) for detecting a start timing and an end timing of each time slot of each user channel;

(d1) a read/write means (R/W) for writing phase states read out from said memory into said PN generator (T-PN) and for writing phase states read out from said PN generator (T-PN) to said memory; and (d2) said read/write means (R/W)
  reading out a phase state for a particular user channel from said memory and writing the read out phase state into said PN generator, when said timing means detects a start timing of a time slot in said frames assigned to said particular user channel; and
  reading out the phase state of said PN generator (T-PN) and writing the read out phase state into said memory, when said timing means detects the end of the time slot belonging to said particular user channel.

2. A transmitter (TX) according to claim 1, wherein said memory is a random access memory (RAM) realized by a field programmable gate array library (FPGA).

3. A transmitter (TX) according to claim 1, wherein said telecommunication system (TELE) is a TDMA or a CDMA system and the time slots assigned to said user channels are TDMA or CDMA time slots, respectively, in the frame.

4. A transmitter (TX) according to claim 1 wherein said memory stores respectively an initialization phase state (111111111) and said write/read means (W/R) reads out and uses it for initializing said PN generator whenever a time slot start timing of a particular user channel is detected in a frame for the first time during a start of a transmission of said frames.

5. A transmitter (TX) according to claim 1, wherein said PN generator (T-PN) comprises a PN sequence programming means (PN-PM) for programming said PN generator (T-PN) to produce a predetermined PN sequence.

6. A transmitter (TX) according to claim 5, wherein said PN sequence programming means (PN-PM) comprises an address conversion means (ACM) for converting a user channel address into programming signals and a gate means (AND1–ANDN, MUX1–MUXN) for receiving said programming signals and for feeding the output signals of said shift registers (SH1–SHN) back via EXOR gates generating the input for the first shift register (SH1) of said PN generator in response to said programming signals.

7. A transmitter (TX) according to claim 6, wherein said gate means (AND1–ANDN; MUX1–MUXN) includes a number of AND gates receiving said programming signals at one input and receiving said output signals of the shift registers at another input thereof and outputting a signal to a respective EXOR gate, said programming signals determining the type of PN sequence generated by said PN generator (T-PN).

8. A transmitter (TX) according to claim 7, wherein said gate means (AND1–ANDN, MUX1–MUXN) further includes multiplexer gates (MUX) having an output terminal connected to an input of the next shift registers, having one input terminal thereof connected to the output of the associated shift register and having another input terminal connected to the input of said associated shift register, and having a control input terminal connected for receiving a programming signal from said address conversion means (ACM), said programming signal applied to said multiplexer gates determining the length of PN sequence generated by said PN generator (T-PN) for each user channel.

9. A transmitter (TX) according to claim 1, further comprising first inverters for inverting bits at predetermined bit positions of said phase state (PST) read out from the phase state memory (ISM) before it is written into the PN generator (T-PN) and second inverters for inverting bits at said predetermined bit positions of the phase state (PST) read out from the PN generator (T-PN) before it is written into said phase state memory (ISM).

10. A transmitter (TX) according to claim 9, wherein said memory stores a reset state and said write/read means (W/R) reads out and uses a predetermined initialization sequence for initializing said PN generator (T-PN) whenever a time slot start timing of a particular user channel is detected in a frame for the first time during a start of a transmission of said frames, wherein said first and second inverters are provided at predetermined bits positions at which bits of said stored reset state and said initialization sequence are different.

11. A receiver (RX) of a telecommunication system (TELE) in which a plurality of user channels (US1, US2) are processed using a time-slot multiplexing of user data (US1, US2) in respective transmission frames (FR), comprising:
   a) one single receiver PN generator (R-PN) including a number (N) of shift registers (SH1–SHN) for generating PN sequences of a predetermined number of bits ($2^n-1$), wherein said predetermined number of bits ($2^n-1$) is larger than the number of bits which can be transmitted for each user channel in a respective time slot;
   b) a PN generator phase state memory (ISM) for storing phase states (PST) of said PN generator (R-PN) for each user channel, a phase state being defined as a N bit sequence respectively stored in said shift registers of said PN generator;
   c) a timing means (TM) for detecting a start timing and an end timing of each time slot of each user channel;
   d1) a read/write means (R/W) for writing phase states read out from said memory into said PN generator and for writing phase states read out from said PN generator (R-PN) to said memory; and
   d2) said read/write means (R/W)
      reading out a phase state for a particular user channel from said memory and writing the read out phase state into said PN generator (R-PN), when said timing means detects a start timing of a time slot in said frames assigned to said particular user channel; and
      reading out a phase state for a particular user channel from said memory and writing the read out phase state into said PN generator (R-PN), when said timing means detects a start timing of a time slot in said frames assigned to said particular user channel; and
      reading out the phase state of said PN generator (R-PN) and writing the read out phase state into said memory, when said timing means detects the end of the time slot belonging to said particular user channel.

12. A receiver (RX) according to claim 11, wherein said memory is a random access memory (RAM) realized by a field programmable gate array library (FPGA).

13. A receiver (RX) according to claim 11, wherein said telecommunication system (TELE) is a TDMA or a CDMA system and the time slots assigned to said user channels are TDMA or CDMA time slots, respectively, in said frame.

14. A receiver (RX) according to claim 11, wherein said memory stores respectively an initialization phase state (111111111) and said write/read means (W/R) reads out and uses said phase state for initializing said PN generator whenever a time slot start timing of a particular user channel is detected in a frame for the first time during a state of a transmission of said frames.

15. A receiver (RX) according to claim 11, wherein said PN generator (R-PN) comprises a PN sequence programming means (PN-PM) for programming said PN generator (R-PN) to produce a predetermined PN sequence.

16. A receiver (RX) according to claim 15, wherein said PN sequence programming means (PN-PM) comprises an address conversion means (ACM) for converting a user channel address into programming signals and a gate means (AND1–ANDN; MUX1–MUXN) for receiving said programming signals and for feeding the output signals of said shift registers (SH1–SHN) back via EXOR gates generating the input for the first shift register (SH1) of said PN generator in response to said programming signals.

17. A receiver (RX) according to claim 16, wherein said gate means (AND1–ANDN; MUX1–MUXN) includes a number of AND gates receiving said programming signals at one input and receiving said output signals of the shift registers at another input thereof and outputting a signal to a respective EXOR gate, said programming signals determining the type of PN sequence generated by PN generator.

18. A receiver (RX) according to claim 17, wherein said gate means (AND1–ANDN; MUX1–MUXN) further includes multiplexer gates (MUX) having an output terminal connected to an input of next shift register, having one input terminal thereof connected to the output of the associated shift register and having another input terminal connected to the input of said associated shift register and having a control input terminal connected for receiving and having a control input terminal connected for receiving a programming signal from said address conversion means (ACM), said programming signal applied to said multiplexer gates determining the length of the PN sequence generated by said PN generator (R-PN) for each user channel.

19. A receiver (RX) according to claim 18, further comprising
first inverters for inverting bits at predetermined bit positions of said phase state (PST) read out from the phase state memory (ISM) before it is written into the PN generator (R-PN) and second inverters for inverting bits at said predetermined bit positions of the phase state (PST) read out from the PN generator (R-PN) before it is written into said phase state memory (ISM); and
a transmitter (TX) of a telecommunication system (TELE) in which a plurality of user channels (US1, US2) are processed using a time-slot multiplexing of user data (US1, US2) in respective transmission frames (FR), comprising:
a) one single transmitter PN generator (T-PN) including a number (N) of shift registers (SH1–SHN) for generating PN sequences of a predetermined number of bits ($2^n-1$), wherein said predetermined number of bits ($2^n-1$) is larger than the number of bits which can be transmitted for each user channel in a respective time slots;
b) a PN generator phase state memory (ISM) for storing phase states (PST) of said PN generator (T-PN) for each user channel, a phase state being defined as a bit sequence respectively stored in said shift registers of said PN generator (T-PN);
c) a timing means (TM) for detecting a start timing and an end timing of each time slot of each user channel;
d1) read/write means (R/W) for writing phase states read out from said memory into said PN generator (T-PN) and for writing phase states read out from said PN generator (T-PN) to said memory; and
d2) said read/write means (R/W):
reading out a phase state for a particular user channel from said memory and writing the read out phase state into said PN generator (T-PN), when said timing means detects a start timing of a time slot in said frames assigned to said particular user channel; and
reading out the phase state of said PN generator (T-PN) and writing the read out phase state into said memory, when said timing means detects the end of the time slot belonging to said particular user channel; said PN sequence programming means (PN-PM) comprises an address conversion means (ACM) for converting a user channel address into programming signals and a gate means (AND1–ANDN, MUX1–MUXN) for receiving said programming signals and for feeding the output signals of said PN registers (SH1–SHN) back via EXOR gates generating the input for the first shift register (SH1) of said PN generator (T-PN) in response to said programming signals;

said gate means (AND1–ANDN; MUX1–MUXN) includes a number of AND gates receiving said programming signal at one input and receiving said output signals of the shift registers at another input thereof and outputting a signal to a respective EXOR gate, said programming signal determining the type of PN sequence generated by said PN generator (T-PN);

said gate means (AND1–ANDN; MUX1–MUXN) further includes multiplexer gates (MUX) having an output terminal connected to an input of the next shift registers, having one input terminal thereof connected to the output of the associated shift register and having another input terminal connected to the input of said associated shift register, and having a control input terminal connected for receiving a programming signal from said address conversion means (ACM), said programming signal applied to said multiplexer gates determining the length of PN sequence generated by said PN generator (T-PN) for each user channel.

20. A receiver (RX) according to claim 19, wherein
said memory stores a reset state and said write/read means (W/R) reads out and uses a predetermined initialization sequence for initializing said PN generator (R-PN) whenever a time slot start timing of a particular user channel is detected in a frame for the first time during a start of a transmission of said frames, wherein said first and second inverters are provided at predetermined bits positions at which bits of said stored reset state and said initialization sequence are different.

21. A telecommunication system (TELE) in which a plurality of user channels (US1, US2) are processed using a time-slot multiplexing of user data (US1, US2) in respective transmission frames (FR), comprising:
at least one transmitter (TX), comprising:
a) one single transmitter PN generator (T-PN) including a number (N) of shift registers (SH1–SHN) for generating PN sequences of a predetermined number of bits ($2^n-1$), wherein said predetermined number of bits is larger than the number of bits which can be transmitted for each user channel in a respective time slot;
b) a transmitter PN generator phase state memory (ISM) for storing phase states (PST) of said transmitter PN generator (T-PN) for each user channel, a phase state being defined as a bit sequence respectively stored in said shift registers of said transmitter PN generator (T-PN);
c) a transmitter timing means (TM) for detecting a start timing and an end timing of each time slot of each user channel;
d) a transmitter read/write means (R/W) for writing phase states read out from said transmitter memory into said transmitter PN generator and for writing phase states read out from said transmitter PN generator (T-PN) to said transmitter memory; and
d2) said transmitter read/write means (R/W)
reading out a phase state of a particular user channel from said transmitter memory and writing the read out phase state into said transmitter PN generator (T-PN), when said transmitter timing means detects a start timing time slot in said frames assigned to said particular user channel; and reading out the phase state of said transmitter PN generator (T-PN) and writing said read out phase state into said transmitter memory, when said transmitter timing means detects the end of the time slot belonging to said particular user channel; and at least one receiver (RX), comprising:
a) one single receiver PN generator (R-PN) including a number (N) of shift registers (SH1–SHN) for generating PN sequences of a predetermined number of bits ($2^N-1$), wherein said predetermined number of bits ($2^N-1$) is larger than the number of bits which can be transmitted for each user channel in a respective time slot;
b) a receiver PN generator phase state memory (ISM) for storing phase states (PST) of said receiver PN generator (R-PN) for each user channel, a phase state being defined as a N bit sequence respectively stored in said shift registers of said receiver PN generator (R-PN);
c) a receiver timing means (TM) for detecting a start timing and an end timing of each time slot of each user channel;
d1) a receiver read/writer means (R/W) for writing phase states read out from said receiver memory into said receiver PN generator (R-PN) and for writing phase states read out from said receiver PN generator (R-PN) to said receiver memory; and
d2) said receiver read/write means (R/W)
reading out a phase state of a particular user channel from said receiver memory and writing the read out phase state into said receiver PN generator (R-PN), when said receiver timing means detects a start timing a time slot in said frames assigned to said particular user channel; and
reading out the phase state of said receiver PN generator (R-PN) and writing the read out phase state into said receiver memory, when said receiver timing means detects the end of the time slot belonging to said particular user channel.

22. A system (TELE) according to claim 21, wherein said memories are random access memory (RAM) realized by a field programmable gate array library (FPGA).

23. A system (TELE) according to claim 21, wherein said telecommunication system (TELE) is a TDMA or a CDMA system and the time slots assigned to said user channels are TDMA or CDMA time slots, respectively, in said frame.

24. A system (TELE) according to claim 21, wherein said memories respectively store an initialization phase state (111111111) and said write/read means (W/R) reads out and uses said phase state for initializing said PN generators whenever a time slot start timing of a particular user channel is detected in a frame for the first time during a start of a transmission/reception of said frames.

25. A system (TELE) according to claim 21, wherein said transmitter PN Generator (T-PN) and said receiver PN generator (R-PN) each comprise a PN sequence programming means (PN-PM) for programming said receiver PN generator (R-PN) to produce a predetermined PN sequence.

26. A system (TELE) according to claim 25, wherein said PN sequence programming means (PN-PM) comprises an address conversion means (ACM) for converting a user channel address into programming signals and a gate means (AND1–ANDN; MUX1–MUXN) for receiving said programming signals and for feeding the output signals of said shift registers (SH1–SHN) back via EXOR gates generating the input for the first shift register (SH1) of said receiver PN generator (R-PN) in response to said programming signals.

27. A system (TELE) according to claim 26, wherein said gate means (AND1–ANDN; MUX1–MUSN) includes a number of AND gates receiving said programming signals at one input and receiving said output signals of the shift registers at another input thereof and outputting a signal to a respective EXOR gate, said programming signals determining the type of PN sequence generated by said receiver PN generator.

28. A system (TELE) according to claim 27, wherein said gate means (AND1–ANDN; MUX1–MUSN) further includes multiplexer gates (MUS) having an output terminal connected to an input of the next shift register, having one input terminal thereof connected to the output of the associated shift register and having another input terminal connected to the input of said associated shift register and having a control terminal connected for receiving a programming signal from said address conversion means (ACM), said programming signal applied to said multiplexer gates determining the length of PN sequence generated by said receiver PN generator (R-PN) for each user channel.

29. A system (TELE) according to claim 21, wherein said transmitter and receiver PN generators (R-PN) are synchronized and said receiver comprises a bit error rate measurement unit (BER) using said receiver PN generator (R-PN) for evaluating bit errors in coded user data sent from said transmitter.

30. A system (TELE) according to claim 21, further comprising
first inverters for inverting bits at predetermined bit positions of said phase state (PST) read out from the phase state memory (ISM) before it is written into the PN generator (R-PN) and second inverters for inverting bits at said predetermined bit positions of the phase state (PST) read out from the PN generator (R-PN) before it is written into said phase state memory (ISM);
a receiver (RX) of a telecommunication system (TELE) in which a plurality of user channels (US1, US2) are processed using a time-slot multiplexing of user data (US1, US2) in respective transmission frames (FR), comprising:
a) one single receiver PN generator (R-PN) including a number (N) of shift registers (SH1–SHN) for generating PN sequences of a predetermined number of bits ($2^N-1$), wherein said predetermined number of bits ($2^N-1$) is larger than the number of bits which can be transmitted for each user channel in a respective time slot;
b) a PN generator phase state memory (ISM) for storing phase states (PST) of said PN generator (R-PN) for each user channel, a phase state being defined as a N bit sequence respectively stored in said shift registers of said PN generator (R-PN);
c) a timing means (TM) for detecting a start timing and an end timing of each time slot of each user channel;
d1) a read/write means (R/W) for writing phase states read out from said memory into said PN generator (R-PN) and for writing phase states read out from said PN generator to said memory; and
d2) said read/write means (R/W)
reading out a phase state for a particular user channel from said memory and writing the read out phase state into said PN generator (R-PN), when said timing means detects a start timing of a time slot in said frames assigned to said particular user channel; and reading out the phase state of said PN generator (R-PN) and writing the read out phase state into said memory, when said timing means defects the end of the time slot belonging to said particular user channel;

said PN generator (R-PN) comprises a PN sequence programming means (PN-PM) for programming said PN generator (R-PN) to produce a predetermined PN sequence;

said PN sequence programming means (PN-PM) comprises an address conversion means (ACM) for converting a user channel address into programming signals and a gate means (AND1–ANDN; MUX1–MUXN) for receiving said programming signals and for feeding the output signals of said shift registers (SH1–SHN) back via EXOR gates generating the input for the first shift register (SH1) of said PN generator (R-PN) in response to said programming signals; said gate means (AND1–ANDN; MUX1–MUXN)) includes a number of AND gates receiving said programming signals at one input and receiving said output signals of the shift registers at another input thereof and outputting a signal to a respective EXOR gate, said programming signals determining the type of PN sequence generated by said PN generator (R-PN);

said gate means (AND1–ANDN; MUX1–MUXN)) further includes multiplexer gates (MUS) having an output terminal connected to an input of next shift register, having one input terminal thereof connected to the output of the associated shift register and having another input terminal connected to the input of said associated shift register and having a control input terminal connected for receiving a programming signal from said address conversion means (ACM), said programming signals applied to said multiplexer gates determining the length of the PN sequence generated by said PN generator (R-PN) for each user channel.

31. A system (TELE) according to claim 30, wherein said memory stores a reset state and said write/read means (W/R) reads out and uses a predetermined initialization sequence for initializing said PN generator (T-PN) or said PN generator (R-PN) whenever a time slot start timing of a particular user channel is detected in a frame for the first time during a start of a transmission of said frames, wherein said first and second inverters are provided at predetermined bits positions at which bits of said stored reset state and said initialization sequence are different.

32. A method for generating PN sequences of a predetermined number ($2^N-1$) of bits for a plurality of user channels in a telecommunication system, in which said plurality of user channels (US1, US2) are processed using a time-slot multiplexing of user data (US1, US2) in respective transmission frames (FR), by means of a single transmitter PN generator (T-PN) or a single receiver PN generator (R-PN) including a number (N) shift registers (SH1–SHN), wherein said predetermined number of bits of said PN sequence is larger than the number of bits of said PN sequence which can be transmitted for each user channel in a respective time slot, comprising the following steps:

a) loading (ST1) said single transmitter PN generator (T-PN) or said single receiver PN generator (R-PN) with user channel specific phase state (PST) stored in a PN generator phase state memory (ISM) when a start timing of the time slot assigned to the specific user channel in the frame is detected, said phase state being defined as N bit sequence;

b) building (ST2) the PN sequence for the specific user channel during the specific time slot; and c) writing (ST3) the phase state (PST) obtained in said single transmitter PN generator (T-PN) or said single receiver PN generator (R-PN) at the end of said specific time slot into said PN generator phase state memory (ISM) as a new user channel specific phase state (PST); wherein d) the sequence of steps a), b), c) is repeated (ST4) for each specific user channel in its specific time slot.

33. A method according to claim 32, wherein for said memory a random access memory (RAM) is employed which is realized by a field programmable gate array library (FPGA).

34. A method according to claim 32, wherein said telecommunication system (TELE) is a TDMA or a CDMA system and the time slots assigned to said user channels are TDMA or CDMA time slots respectively, in said frame.

35. A method according to claim 32, further comprising the step of reading out from said memory an initialization phase state (111111111) and using said phase state for initializing said single transmitter PN generator (T-PN) or said single receiver PN generator (R-PN) whenever a time slot start timing of a particular user channel is detected in a frame for the first time during a start of a transmission of said frames.

36. A method according to claim 32, wherein generating said PN sequences is carried out by a PN generator of transmitter of said telecommunication system.

37. A method according to claim 32, wherein generating said PN sequences is carried out by a PN generator of a receiver of said telecommunication system.

38. A method according to claim 32, wherein the PN generator (T-PN) is programmed to produce a predetermined PN sequence for each user channel.

39. A method according to claim 38, wherein a user channel address is converted into programming signals and said programming signals are used for determining the logical influence of an output signal of said shift registers back via EXOR gates for generating the input of the first shift register (SH1) of said PN generator (T-PN), said programming signals determining the type of PN sequence generated by said PN generator (T-PN).

40. A method according to claim 38, wherein a user channel address is converted into programming signals and said programming signals are used for determining the bypassing of one or a predetermined number of shift registers of said PN generator (T-PN), said programming signals determining the length of PN sequence generated by said PN generator for each user channel.

41. A method according to claim 32, wherein said memory stores a reset state and a predetermined initialization sequence is read out and used for initializing said PN generator (T-PN) or said PN generator (R-PN) whenever a time slot start timing of a particular user channel is detected in a frame for the first time during a start of a transmission of said frames, wherein the inversion is respectively performed at predetermined bits positions at which bits of said stored reset state and said initialization sequence are different.

* * * * *